(12) United States Patent
Opsvik et al.

(10) Patent No.: US 9,161,636 B2
(45) Date of Patent: Oct. 20, 2015

(54) BABY CRADLE AND MOUNTING DEVICE

(75) Inventors: Peter Opsvik, Oslo (NO); Ingegjerd Eidsvik, Skodje (NO)

(73) Assignees: STOKKE AS, Skodje (NO); PETER OPSVIK AS, Oslo (NO)

( * ) Notice: Subject to any disclaimer, the term of this patent is extended or adjusted under 35 U.S.C. 154(b) by 0 days.

(21) Appl. No.: 13/806,481

(22) PCT Filed: Jun. 23, 2011

(86) PCT No.: PCT/NO2011/000180
§ 371 (c)(1),
(2), (4) Date: May 2, 2013

(87) PCT Pub. No.: WO2011/162618
PCT Pub. Date: Dec. 29, 2011

(65) Prior Publication Data
US 2013/0214571 A1    Aug. 22, 2013

(30) Foreign Application Priority Data

Jun. 24, 2010  (NO) .................................. 20100918

(51) Int. Cl.
*A47C 1/08*  (2006.01)
*A47D 1/10*  (2006.01)
*A47D 15/00*  (2006.01)
(Continued)

(52) U.S. Cl.
CPC  *A47D 1/10* (2013.01); *A47D 1/103* (2013.01); *A47D 15/00* (2013.01); *B60N 2/2806* (2013.01); *B60N 2/2821* (2013.01); *B60N 2/2869* (2013.01); *B60N 2/2887* (2013.01); *B60N 2/4811* (2013.01); *B60N 2/4814* (2013.01)

(58) Field of Classification Search
CPC .. B60N 2/2806; B60N 2/2869; B60N 2/2821; B60N 2/2887; B60N 2/4811; B60N 2/4814
USPC ................. 297/217.7, 216.2, 256.14, 256.16, 297/256.17, 250.1, 253, 130
See application file for complete search history.

(56) References Cited

U.S. PATENT DOCUMENTS 2,324,421 A * 7/1943 Ouellette ..................... 297/310
3,563,601 A * 2/1971 Dickey .......................... 297/466
(Continued)

FOREIGN PATENT DOCUMENTS

DE    202004016992 U1    1/2005
GB         815007 A       6/1959
(Continued)

OTHER PUBLICATIONS

Search Report dated Jan. 7, 2011 for corresponding Norwegian Application No. 20100918.

*Primary Examiner* — Chi Q Nguyen
(74) *Attorney, Agent, or Firm* — Knobbe Martens Olson & Bear LLP

(57) ABSTRACT

The present invention relates to a cradle (10) for a chair (1), where the chair comprises a chair back (11) having at least one element having an upper end or edge (12), characterized in that the cradle comprises at least one hooking means (122) in the rear portion of the cradle which enables the cradle to be hooked over the upper end or edge of the chair back elements (s), said cradle also being capable of standing alone on a base, such as a floor, when it is not hooked onto the chair back and, in both cases, is used as a cradle or a seat for a baby or small child.

27 Claims, 13 Drawing Sheets

(51) Int. Cl.
  *B60N 2/28* (2006.01)
  *B60N 2/48* (2006.01)

(56) References Cited

U.S. PATENT DOCUMENTS

| | | | | |
|---|---|---|---|---|
| 6,095,604 | A * | 8/2000 | Stack et al. | 297/254 |
| 6,199,949 | B1 * | 3/2001 | DaSilva | 297/256.12 |
| 6,296,307 | B1 * | 10/2001 | Holtke | 297/219.12 |
| 6,324,732 | B1 * | 12/2001 | Arisaka et al. | 24/458 |
| 6,679,550 | B2 * | 1/2004 | Goor et al. | 297/216.11 |
| 7,216,932 | B2 * | 5/2007 | Emmert | 297/256.16 |
| 7,325,871 | B2 * | 2/2008 | Gangadharan et al. | 297/256.16 |
| 7,472,955 | B2 * | 1/2009 | Crane et al. | 297/256.16 |
| 7,712,830 | B2 * | 5/2010 | Lhomme et al. | 297/256.12 |
| 8,567,867 | B2 * | 10/2013 | Arnold et al. | 297/383 |
| 2005/0127727 | A1 * | 6/2005 | Gangadharan et al. | 297/256.16 |
| 2006/0091709 | A1 * | 5/2006 | Emmert | 297/256.16 |

FOREIGN PATENT DOCUMENTS

| | | |
|---|---|---|
| GB | 2254548 A | 10/1992 |
| GB | 2360938 A | 10/2001 |
| GB | 2380663 A | 4/2003 |
| WO | 2005/122843 A2 | 12/2005 |

* cited by examiner

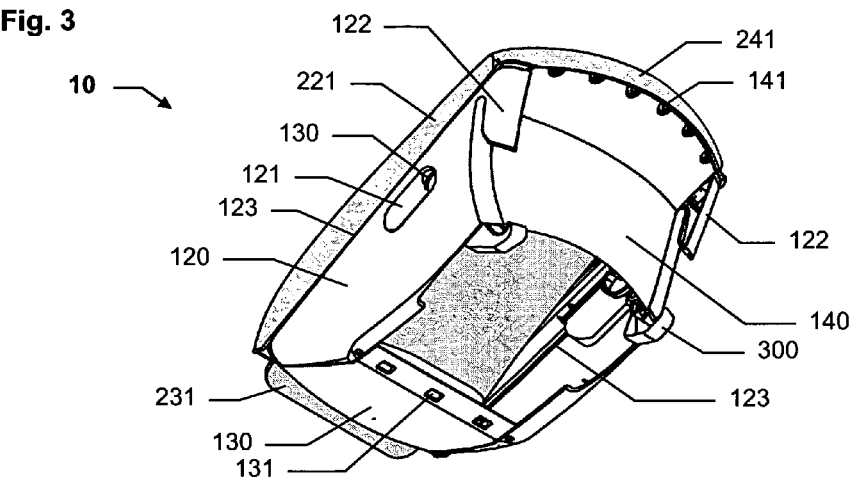

Fig. 9A
Fig. 9B
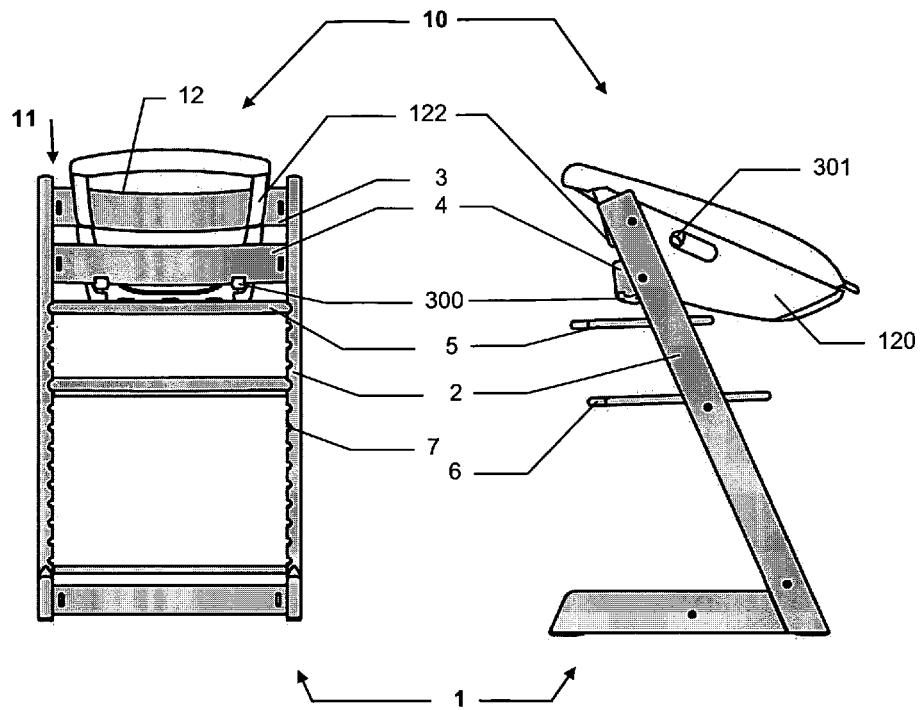
Fig. 10
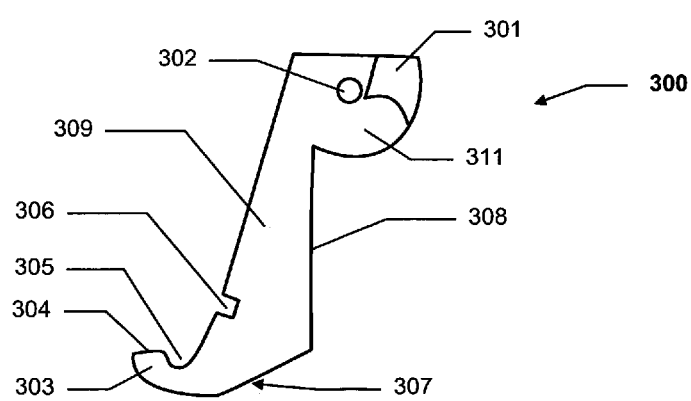

Fig. 13
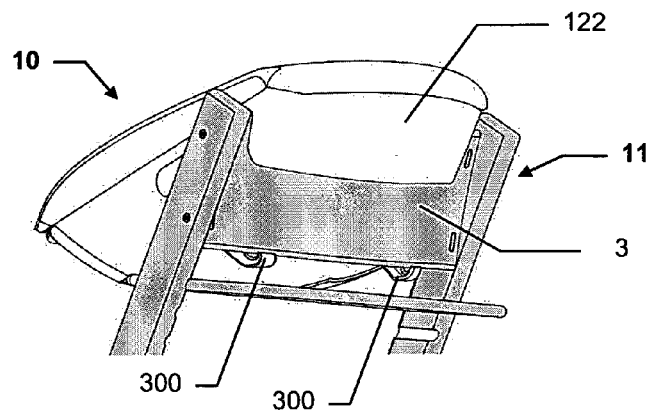
Fig. 14A
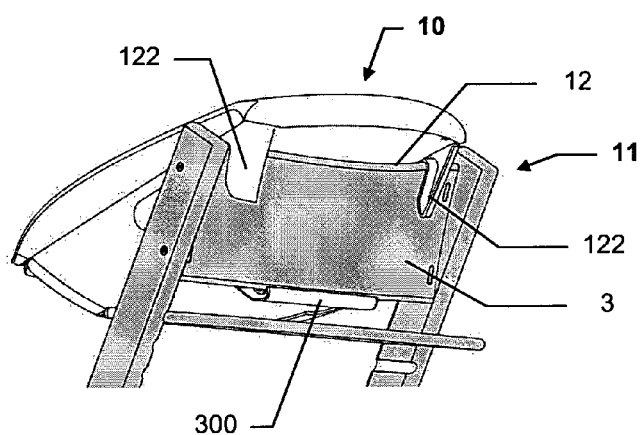
Fig. 14B
Fig. 14C
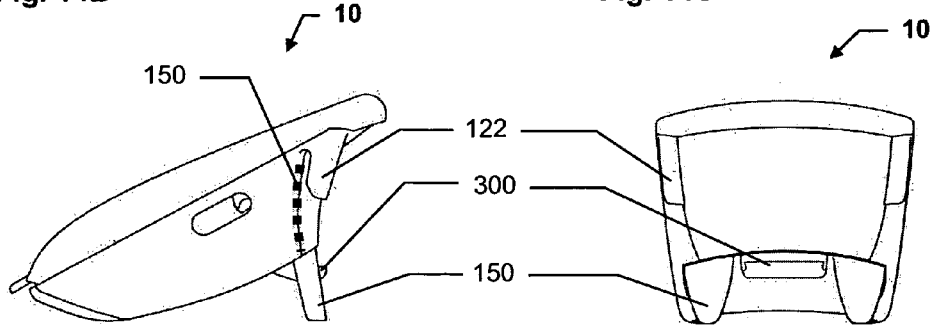

Fig. 16A
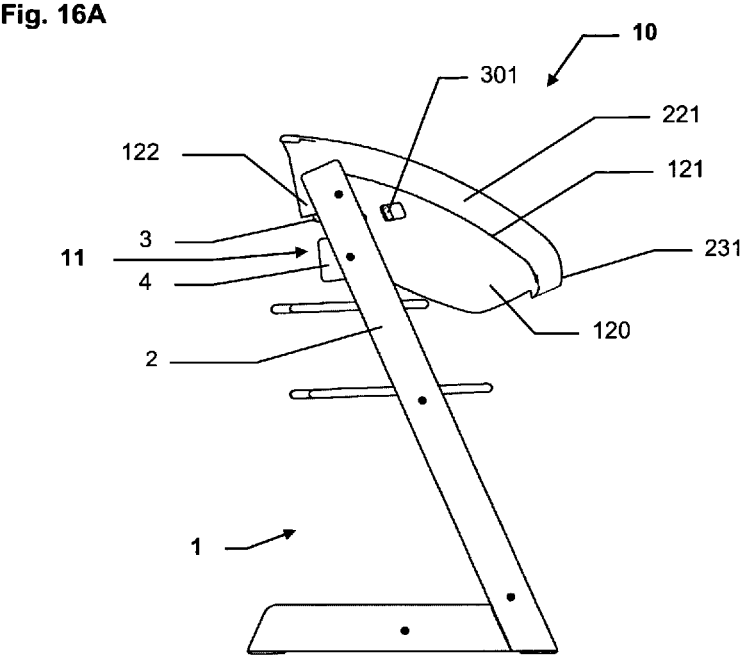
Fig. 16B   Fig. 16C
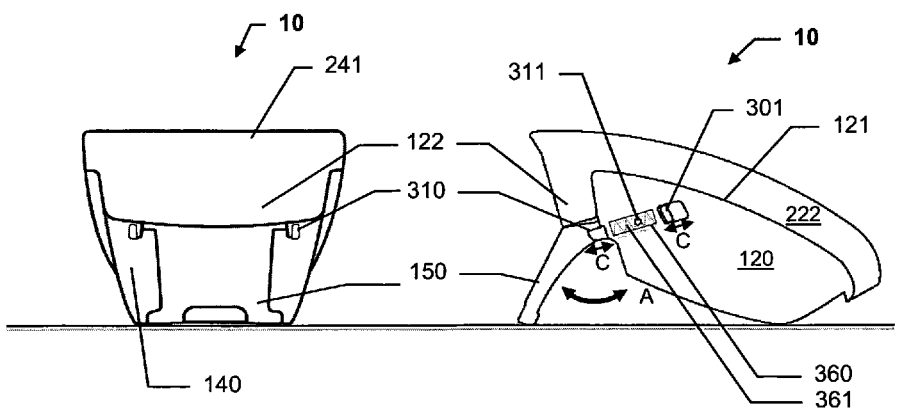

BABY CRADLE AND MOUNTING DEVICE

CROSS-REFERENCE TO RELATED APPLICATIONS

This application is the U.S. National Phase under 35. U.S.C. §371 of International Application PCT/NO2011/000180, filed Jun. 23, 2011, which claims priority to Norwegian Patent Application No. 20100918, filed Jun. 24, 2010. The disclosures of the above-described applications are hereby incorporated by reference in their entirety.

The present invention relates to a baby cradle or a baby seat for a chair and a mounting device for fastening said cradle or seat to a chair. The baby cradle is especially suitable for use both on the floor and mounted on a chair where the chair has a backrest element with substantially horizontal upper and lower edges.

BACKGROUND

There is currently a need to be able to place babies in a seat or a cradle, adapted to table height, so that one is able to watch over the baby when sitting at a table, such as at a dining table or work table. Today there are no good alternatives for this type of placement of babies and small children.

Babies of 0-6 months of age are unable to sit upright and preferably should be lying down, or half-sitting at a reclining angle, because the child's back is not sufficiently developed to support the entire weight of the child and may thus be damaged by overstraining. For this reason the usual high chairs for small children are not suitable for use with babies and very small children.

In recent years, there has also been a trend in several countries and regions toward adopting their own safety requirements for equipment for use with children, such as for high chairs and harnesses. These standards are continuously being taken into consideration in the development of new child seats, but it may be difficult to adapt chairs and equipment that have been in production for a long time, before such safety requirements came into effect. It is especially difficult to carry out such adjustments without making physical modifications on the chairs.

This is the case, for example, with the child seat Tripp-Trapp®, which was developed as early as 1972 and patented in 1976 and which continues to be a very popular child seat in many countries.

The chair is designed to be adjustable in accordance with the child's body size, and it therefore has a seat plate and a foot plate that may be moved into various height positions by being slid into opposing horizontal grooves at several levels on the inside of the side members of the chair and locked into these grooves by tightening and reducing the distance between the side members by the use of transverse elements between the side members, in this case two bars, one cross rail and one transversal backrest comprising two parallel transverse elements. The seat plate is further adjustable in its depth position by the plate's being pushed forward or backward relative to the seat back before the side members have been tightened toward one another, to be then locked in correct position by said tightening, thereby providing the correct seat length under the thighs of the child who is using the chair.

There is a need for a seat or cradle for babies that is easily mountable on existing chairs, both on ordinary dining table chairs and child seats, for example a TrippTrapp® chair, such as on the top part of the chair, the back part, the back legs or side members, preferably without the use of odd parts, fittings or tools.

PRIOR ART

Today there are found car seats, rockers/infant seats for placement on the floor, and seats for baby carriages that are adapted to a reclining sitting position, as mentioned above, but none of these are adapted to or suitable for placement at table height indoors, except that some baby seats for strollers can be mounted high up on a stroller frame. It may be impractical, however, to use a stroller indoors in a residence in order to bring the baby up closer to a grownup, as for example in a meal situation. A rocker or infant seat may be practical when the baby has become so big that it no longer only wants to lie down. The child is still not able to sit alone, so it is important to use a chair that has the correct angle for the child's back or is adjustable in the back. A rocker/infant seat, however, should always be placed on the floor so that it cannot fall down from another piece of furniture, such as when the baby or child makes unexpected sudden movements, and so that other persons do not accidentally bump into the infant seat. The disadvantage of placing a rocker/infant seat (or a car seat) on the floor, for example when the family is sitting at a dining table, is that it makes it difficult to watch over the baby and gives the baby itself a poor view of its surroundings when it would probably want to follow what is happening. Being placed on the floor often results in protests by the baby for being "abandoned" at a different level than that of the other persons who are present. Placing a rocker/infant seat or a car seat on a table is particularly impractical during a meal because it takes up a lot of space and is, in addition, a safety hazard in that the seat could fall down, as mentioned above, particularly if the attention toward the child is directed elsewhere for a brief period. The same type of safety hazard arises if such a chair or seat is placed on an ordinary chair, such as a dining chair, without being secured to the chair, and the probability for an accident is even greater due to the limited area on a chair seat.

Car seats are generally unsuitable as indoor seats for keeping since they are narrow and tight-fitting around the child and have a relatively small angle between the seat surface and the back support, i.e., a relatively crouched sitting position. This design is a consequence of the safety requirements for use in cars and restricts the child's freedom of movement. Such seats should therefore only be used for limited periods at a time.

From GB 2 407 489 there is known a stand for holding a car set, enabling the car seat to be used in combination with the stand as a high chair. However, the solution has the aforementioned disadvantages of car seats, in addition to the fact that the stand cannot be used for other purposes and takes up space when not in use.

From US 2006/0181123 there is known a rocker/infant seat mountable in a stand for the purpose of positioning the seat higher than ground level. However, there are the same disadvantages with the stand as in the solution above, namely that it takes up space and has no other functions and must therefore be put away or taken along if the seat is to be used somewhere else.

The Purpose of the Invention

It is an objective to provide an attachment means for a baby cradle or seat, enabling owners of existing chairs to upgrade or expand the function of their chairs. It is also an objective to avoid physical modification of the chair, such as making holes in some of the parts, or inserting screws that leave disfiguring marks on the chair which will be visible when there is no longer a use for the cradle or seat. Such physical modifications also carry the risk that the user might execute the adaptations in the wrong way and thus jeopardize the safety of the chair, and they are therefore undesirable. It is therefore an objective of the invention that the fastening of the cradle or seat shall be as intuitive and simple as possible, at the same time as the safety is maintained.

Hence it is an objective to provide a cradle/seat into which a baby may be placed in the proper ergonomic position as a function of the baby's age and development, at table height, in a simple and secure way, using equipment that is not unreasonably demanding of space, by using an existing chair, where both the chair and the cradle can in addition be used independently of one another when they are not coupled together.

General Description

To solve the above-mentioned problems and challenges a cradle for a chair has been developed, according to the invention, which comprises fastening and locking devices to attach the cradle to a chair, where the chair has a transverse backrest having at least one horizontal lower and one horizontal upper edge. The cradle comprises one or more hooks on the rear edge thereof which grip over the upper edge of the chair back, in combination with one or more locking devices on the rear edge of the cradle that are adjustable for gripping over the lower edge of the chair back and locking the cradle/seat securely to the chair. The locking device(s) preferably include (s) an automatic locking function which satisfies the requirement for "two independent simultaneous actions" for unlocking of the locking device(s).

The invention thus relates to a cradle for a chair, where the chair comprises a chair back having at least one element with an upper end or edge, characterized in that the cradle comprises at least one hooking means in the rear portion of the cradle that enables the cradle to be hooked over an upper end, part or edge of the chair back element(s), said cradle also being capable of standing alone on a base, such as a floor, when it is not hooked onto the chair back and, in both cases, is used as a cradle or a seat for a baby or small child.

The invention further relates, in one aspect, to a cradle where the chair back element is selected from the group consisting of: one or more cross rails, side members, wall members, back legs or a central stem, and where the cradle may be hooked by hooking means over the upper end or edge of one or more of the chair back element(s), preferably over a substantially horizontal upper edge of the chair back element (s), and more preferably over a substantially horizontal upper edge of a cross rail. In one aspect it relates in particular to a cradle where the hooking means are ferrules adapted to fit down over the upper end, part or edge of the chair back element(s), said chair back elements preferably being chosen from one or more of: the side members, the upper part of the chair's sides, walls or back legs.

The invention is also directed toward a cradle where at least one of the chair back elements comprises a lower edge and wherein the cradle comprises at least one movable locking device in the rear part of the cradle configured to be brought from an inactive position which does not restrict the movement of the cradle relative to the chair, to an active position where the locking device(s) bear(s) against at least one lower edge of the chair back elements and locks the cradle to the chair, preferably against a substantially horizontal lower edge of the chair back element(s), and more preferably against a substantially horizontal lower edge of a cross rail.

In one alternative the locking device(s) comprise(s) at least one substantially horizontal element slidably attached to the cradle and movable in a direction parallel to the cradle from an inactive position to bear against a lower horizontal edge of a cross rail in an active position when the cradle is hooked onto a chair back, where the element is preferably bar shaped.

In another alternative the locking device(s) comprise(s) at least one hook pivotably mounted on the cradle and capable of rotation from an inactive position to grip around the lower horizontal edge of a cross rail in an active position when the cradle is hooked onto a chair back.

It is also possible for the locking device to comprise a combination of the aforementioned locking devices in the form of a slidable and pivotable locking device.

The locking device(s) may be spring-loaded in order to bring the locking device(s) from an inactive position to an active position for locking the cradle to the chair. Further, the locking device(s) are operable by buttons or levers, preferably accessible on the outside of the cradle, alternatively integrated into a handle on the outer sides of the cradle, alternatively integrated into the handle in the form of recesses in the outer sides of the cradle. The cradle may also comprise an indicator panel, preferably for each locking device, which shows whether the cradle is correctly mounted on the chair, preferably by a visible panel displaying a red marker when the locking device(s) is/are inactive in an unlocked position and green when the locking device(s) is/are in active locked position.

Further, the locking device(s) may be housed in the cradle when in an inactive position and may be placed in the cradle's side members (120), rear wall member (140) or hooking means (122) or a combination of these parts, preferably in the lower portion of these parts.

In one aspect, the invention is directed toward a cradle wherein the bottom of the cradle is concave in the longitudinal direction toward a base, enabling the cradle to be rocked when standing on the base, preferably with the side members having a lower concave edge enabling them to be used as rockers, preferably with the underside of the side members including a friction coating, such as a partially inlaid rubber strip.

The invention is in another aspect directed to a mounting device for attachement of a cradle or a seat to a chair having a chair back as described above, wherein the mounting device comprises one or more hooking means and one or more locking devices according to the above. The mounting device may be for attachement of a cradle or a seat to a chair having a chair back with at least one element having an upper end or edge and at least one element with a lower edge, the mounting device being detachable or permanent fastened to the cradle and wherein the mounting device comprises:

one or more hooking means that enables the cradle to be hooked over an upper end, part or edge of the chair back element(s); and one or more locking device configured to be brought from an inactive position which does not restrict movement of the cradle relative to the chair, to an active position where the locking device(s) bear(s) against at least one lower edge of the chair back elements(s) and locks the cradle to the chair.

Said mounting device also allows the cradle to stand alone on a base, such as a floor when it is not hooked onto a chair back for use as a separate cradle or seat for a baby or small child.

Further, the locking device(s) in its/their active position(s) function(s) as legs against a base when the cradle is not mounted on a chair, and preferably position(s) the cradle at a steeper angle toward the base than when the locking device(s) is/are inactive. The cradle may also comprise one or more support flaps which are rotatable or slidable in and out of the cradle like a foot, in order to provide support against a base when the cradle is not mounted on a chair, and which position(s) the cradle at a steeper angle toward the base than when the cradle stands unsupported on the base, where the support flap(s) preferably provide(s) support under the rear part of the cradle during use, and wherein said support flap(s) preferably are housed in the cradle when not in use, for example in the rear wall member or the underside of the cradle.

The cradle according to the invention may have a shell construction in the form of a hard shell comprising two parallel side members connected together by a front wall member and a rear wall member, and alternatively has an underside in the form of a plate. Further, the cradle may have a seat portion comprising a backrest, preferably having an upper backrest edge, two inner side members, preferably having upper side edges, and a seat portion and preferably a footrest. The seat portion may constitute a partially self-supporting seat cover, which comprises a textile, preferably padded, optionally having integrated stiffening material or stiffening parts. The seat portion may be suspended around the upper edges of the shell by attachment to the shell's outer, upper parts, preferably by fastening devices such as grooves and/or hooks/buttons or by means of elastic material such as a stretch material around substantially the entire circumference of the seat portion.

The invention is particularly directed toward a cradle comprising one downward oriented hooking means in the rear upper part thereof and two fastening devices in the form of slidable spring-loaded bar elements, and the cradle is particularly suited for mounting on an ordinary chair, a child seat and especially a TrippTrapp® chair.

The advantage of the cradle according to the present invention is thereby that it may be used on an existing chair, such as a TrippTrapp® chair or other chairs, without making physical modifications on any of the chair parts. Hence it is not necessary to use fastening means such as screws, or loose straps that may easily be lost when moving and storing the cradle, or straps mounted on the chair which mar the appearance of the chair when the cradle is not in use. The cradle is securely locked solely by means of integrated parts and is easily removable after use or movable to another similar chair when there is no longer a need for it. The cradle is not affected by any potential adjustments of the chair's foot plate and/or seat plate, either vertically or horizontally, such as height adjustment or depth adjustment, and thus does not impede any of the chair's functions. Hence, the use of the chair is adaptable for a plurality of different users in a simple and flexible manner when the cradle is detached from the chair.

The flexible cradle/seat according to the invention makes it possible to use the cradle both mounted on a chair and freestanding alone, without odd parts or stands that must be stored or taken care of. Further, the cradle may easily be used on other similar chairs since it does not require any physical modification of the chair or parts for mounting the cradle on another chair, so that the child seat or the baby cradle may easily be used in other places such as on chairs in other homes, with friends or family, or at a restaurant. The cradle is also well suited for use in the infant departments of day care centers or institutions and hospitals where the needs may shift as a result of continuous changes in the age constellation and the children's development.

The invention will be described in the following in greater detail with the aid of embodiment examples with reference to the attached figures, none of which are intended to limit the scope of the invention, but which serve as examples of embodiment forms of the invention.

BRIEF DESCRIPTION OF THE DRAWINGS

FIG. 3 is a front perspective view, from below, of the cradle in FIG. 1.
FIG. 4 is a view from below of the cradle in FIG. 1.
FIG. 5 is a view from above of the cradle in FIG. 1.
FIG. 9A is a rear view of the cradle and the chair in FIG. 1.
FIG. 9B is a side view of the cradle and the chair in FIG. 1.
FIG. 10 is a detail view of the locking device in FIGS. 6A, 6B, and 9A, 9B.
FIG. 13 is a rear perspective view of the cradle according to the invention mounted on a chair.
FIG. 14A is a rear perspective view of the cradle according to the invention mounted on a chair.
FIG. 14B is a side view of the cradle in 14A with the support flap deployed.
FIG. 14C is a rear view of the cradle in 14A with the support flap deployed.
FIG. 16A is a side view of a cradle according to the invention mounted on a chair.
FIG. 16B is a rear view of the cradle in FIG. 16A with the support flap deployed.
FIG. 16C is a side view of the cradle in FIG. 16A with the support flap deployed.

DETAILED DESCRIPTION

In the description that follows, the following words and expressions shall be understood as follows:

By "in front of," "front side," "from the front," "forward," "in front" and similar expressions is meant the horizontal direction toward which the face and chest of a child sitting in a chair in the usual manner are turned.

By "behind," "rear," "backwards" or "at the back of" is meant the opposite horizontal direction, i.e., the direction toward which the back of a child sitting in a chair in the usual manner is turned.

By "transverse" side or direction is meant the horizontal direction perpendicular to the plane of symmetry through the cradle.

By "length," "depth" or "longitudinal direction" is meant the horizontal direction in the plane of symmetry of the cradle.

By "cradle" is meant a reclined seat for a baby or a child having an angle for the backrest relative to a seat plate that is somewhere between horizontal lying position and normal sitting position, optionally including normal sitting position.

By "chair back" or "seat back" is meant the assembly of the part or parts of a chair or seat extending away from the upper side of a sitting surface or seat plate in a chair or a seat, particularly the backrest.

By "backrest" is meant the part(s) or elements of a chair back that contribute toward supporting the back of the user of the chair or seat, which may include one or more of: side members, side panels, cross rails, central stem, back legs, back portion and the like.

By "edge" is meant the physical termination or end of an element, such as a plate or a rail. By "upper edge" is meant an edge on the upper side of the element, and by "lower edge" is meant an edge on the underside of the element.

Figure 1:
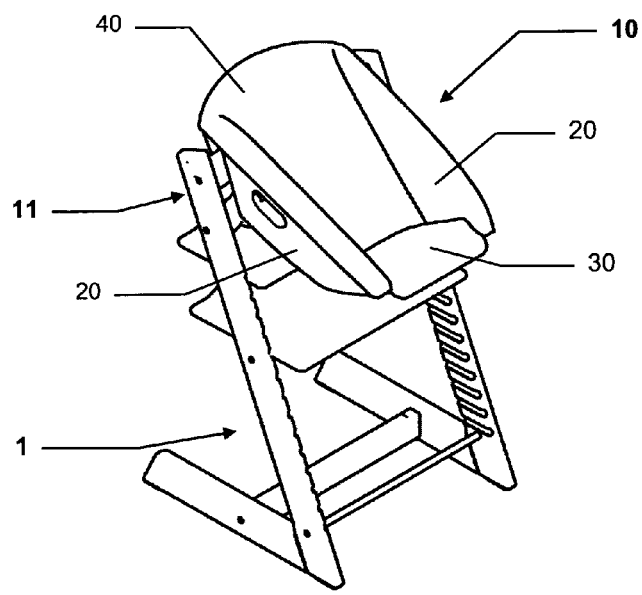
FIG. 1 is a front perspective view, from above, of a cradle according to the invention mounted on a chair.

FIG. 1 shows the cradle 10 according to the invention mounted on a chair 1, in this case a child seat of the type TrippTrapp®. As can be seen, the cradle is fastened to the backrest of the chair and is suspended therefrom. This positions the baby who is sitting or lying in the cradle at a height relative to, for example, a dining table that enables the baby to follow along with what is happening, such as during meals. The height and the angle of the cradle, when mounted on the chair, also make it easy to feed the baby while an adult is sitting on an ordinary chair, such as a dining table chair. The child is thus raised up from the floor as compared to an alternative rocker/infant seat, and the adult person does not have to sit on the floor or bend down in order to interact with the baby, for example during feeding. This way one avoids placing a rocker/infant seat or car seat on a table, such as a dining table or coffee table, which is a practice that is quite common among adults today in order to keep an eye on the child, but which presents a risk that the rocker/infant seat or car seat could fall down from the table, and which moreover takes up considerable space on a dining table.

The cradle 10 comprises basically two essentially parallel side members 20 in the longitudinal direction with a seat part 30 and a backrest 40 there between, said seat part 30 and backrest 40 being connected to one another at adjoining transverse ends in a given sitting angle. The angle between seat part 30 and backrest 40 should be adapted to the age of the child who will be using the cradle, so that the child will able to stretch out, but still sit in a more upright rather than completely horizontal position.

Alternatively the cradle may be constructed for adjustment of said angle between the seat part and the backrest.

Figure 2:
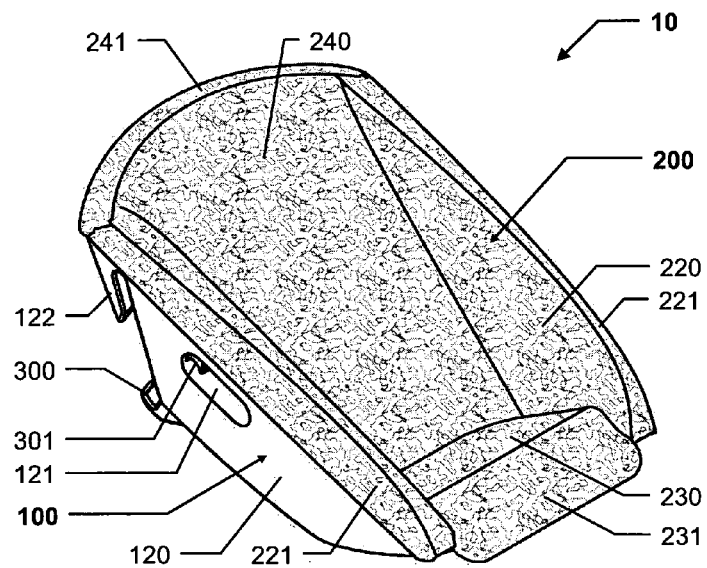
FIG. 2 is a front perspective view, from above, of the cradle in FIG. 1.

Cradle 10 may be produced in various ways and from different materials or compositions of materials. In this embodiment cradle 10, as shown in more detail in FIG. 2, is composed of an outer shell 100 and a seat portion 200 (where the seat portion is patterned for the purpose of illustration).

Shell 100 is made of a first material, such as hard plastic, and constitutes a structural frame for the seat portion 200.

Seat portion 200 is made of a different material which may be softer than the first, such as a composite material of one or more semi-rigid and soft materials, and may form a partially self-supporting seat cover.

FIGS. 3-5 show cradle 10 in more detail. The outer shell 100 comprises two substantially parallel side members 120 which are connected to one another by a front 130 and rear 140 wall member (see FIGS. 3 and 4). Both of the side members 120 also preferably comprise a handle 121 or edge, such as in the form of a recess or edge in the side members 120, which can be used to lift and carry the cradle.

For fastening of the cradle to a chair, the outer shell comprises one or more hooking means 122 on the rear part of the cradle, such as in side members 120 and/or the outer part of rear wall member 140. In this embodiment the hooking means 122 are configured as one or more parallel downward oriented hook(s) or catch(es), and these are in this embodiment formed as an extension of the upper rear corners of side members 120 and/or an extension of the upper rear corners of rear wall members 140. To secure the locking of cradle 10 to chair 1 so that the cradle cannot fall off by accident, as by exertion of forces directed upward against the cradle, the cradle in this embodiment comprises one or more adjustable locking devices 300 on the back part of the cradle, such as in the rear portion of side members 120 and/or the outer portion of rear wall member 140 below the hooking means 122.

In this embodiment the locking devices 300 are configured as two parallel upward oriented hooks or catches in an extension of the lower rear corners of side members 120 and/or lower outer corners of rear wall member 140 in their deployed, or opened, state. However, both the hooking means 122 and locking devices 300 could be positioned on the cradle in a manner that is practical with respect to the type of chair and the shape of the backrest to which they are to be attached. The locking devices 300 are rotatable in a plane that is essentially parallel to the plane of symmetry of the cradle, or essentially perpendicular to the part of the backrest of chair 1 where the locking device(s) are to grip around a lower edge of a lower horizontal backrest edge on the chair. In this embodiment, the actuation of the rotation of the locking devices is provided for by a push-button 130 situated in the recess of the handles 121.

The locking devices 300 may be spring-loaded so as to be tensioned toward an active, deployed position where they grip around a lower edge of the chair back 11 on a chair, as is shown in FIG. 1, and where the push-buttons 130 must be operated, such as by being pressed inward, backward, forward or upward, for example, in this case upward, in order to rotate the locking device against the tension spring to an open/retracted or inactive position that permits the removal of the cradle 10 from the chair 1 on which it is mounted.

Figure 19:
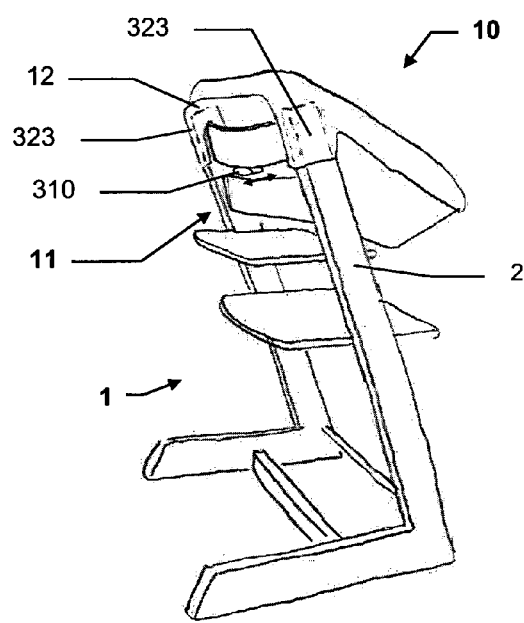
FIG. 19 is a rear perspective view of a cradle according to the invention mounted on a chair.

For safety reasons there should be two push-buttons 130 which function independently of each other, where both must be operated in order to release the cradle from a chair on which it is mounted so that an accidental or unintentional actuation of one of the buttons does not unlock the cradle. This would also be advisable if, for example, only one locking device is used, such as one broad, centrally positioned locking hook (as shown in FIGS. 14A and 19), which is also foreseen in this invention.

Seat portion 200 may comprise a textile and is preferably padded, optionally with integrated stiffening material or stiffening parts, in all or parts of seat portion 200, to give the seat portion its form. Seat portion 200 in this embodiment as shown in FIG. 2 is suspended over the upper edges of shell 100 by being attached to fastening devices on the exterior upper parts of the shell. Seat portion 200 comprises a backrest 240 having an upper backrest edge 241, two inner side portions 220 having upper and outer side edges 221, a seat part 230 and a leg support 231 as is shown in FIG. 2.

As can be seen from FIGS. 3 and 5, the upper backrest edge 241 and the two upper side edges 221 of seat portion 200 cover respectively both the upper edge of rear wall member 140 and the upper edges of side members 220 in addition to the upper exteriors of these elements. In this embodiment the seat portion is also fastened to the outside of shell 100 by attachment of backrest edge 241 to fixation points 141 in the outer upper area of rear wall member 140, such as by loops fastened around, for example, hooks, catches, buttons or the like, and where the side edges 221 comprise an expansion of the thickness of the end edges, such as sewn-in stays or plastic battens in the edges, which are inserted into grooves 123 in the upper outer portion of side members 120 along the main length of the side members 120. Seat part 230, or the joint between seat part 230 and backrest 240, may in addition be fastened, such as via straps, to fixation points 131 in shell 100, in this embodiment in the form of holes having integrated crosspieces around which the straps may be threaded in the lower part of front wall member 130. In this way the seat portion is strapped securely to the shell by being fastened to the outside of at least three upper edges of the shell and being anchored, preferably in an elastic manner, to a lower part of the shell and preferably on the inside of front wall member 130, such as by a Velcro® closure, or by comprising a pocket designed to be drawn over the upper edge of the front wall member. Leg support 231 need not necessarily be attached to the shell, but may optionally be fastened to the upper edge of front wall member 130, for example by opposing Velcro® strips on each of the aforementioned elements.

Figure 6A:
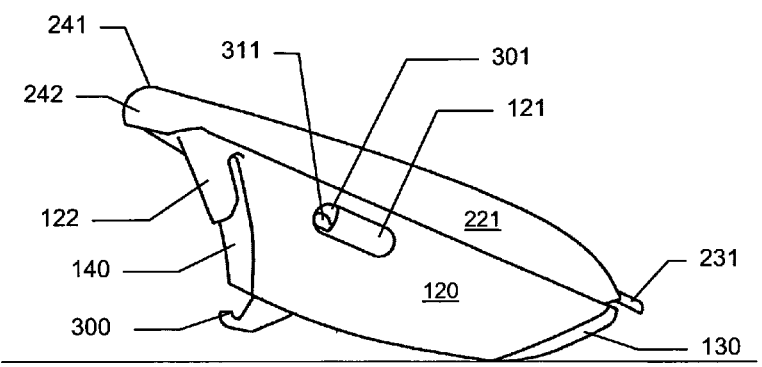
FIG. 6A is a side view of a cradle according to the invention with the locking devices deployed.
Figure 6B:
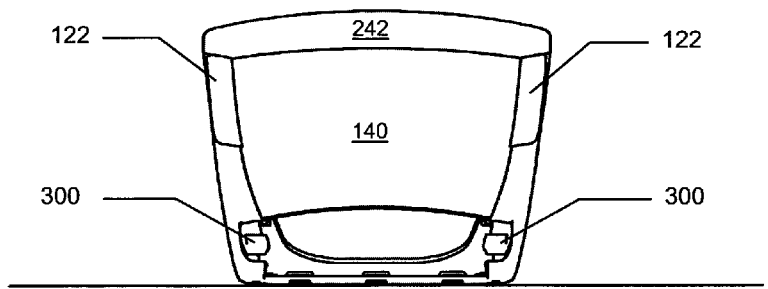
FIG. 6B is a rear view of the cradle in FIG. 6A.
Figure 6C:
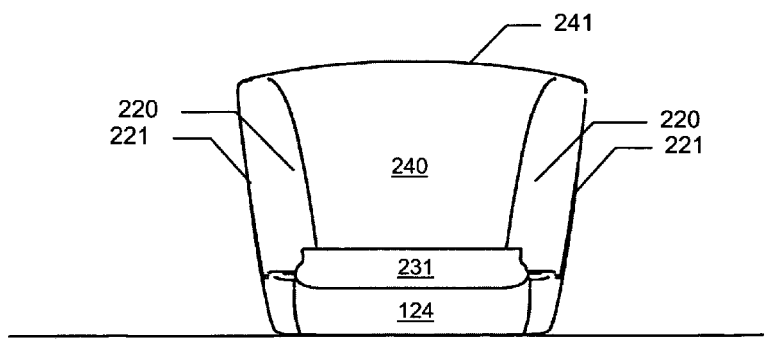
FIG. 6C is a front view of the cradle in FIG. 6A.

In FIGS. 6A-6C cradle 10 is shown with locking devices 300 open or deployed, where the cradle is at roughly the same angle as it would have when mounted on a chair. This angle may be approximately equal to or close to the angle of the cradle when placed on a base, such as on the floor with deployed locking devices 300 which can then be used as support legs. As can be seen from the figures, locking devices 300 can be used as low back legs to support the cradle in a position where the baby sits in a slightly upraised, supported position, about like when the cradle is mounted on the chair or a slightly lower position.

Figure 7A:
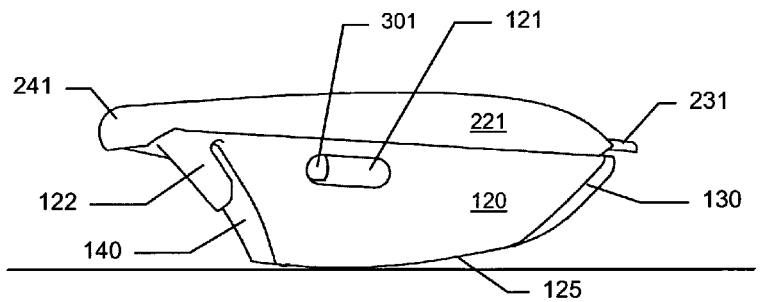
FIG. 7A is a side view of the cradle in FIG. 6A with the locking devices retracted.
Figure 7B:
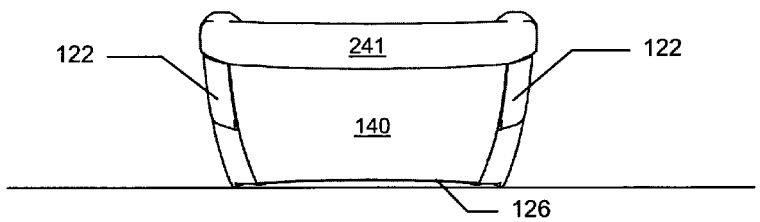
FIG. 7B is a rear view of the cradle in FIG. 7A.
Figure 7C:
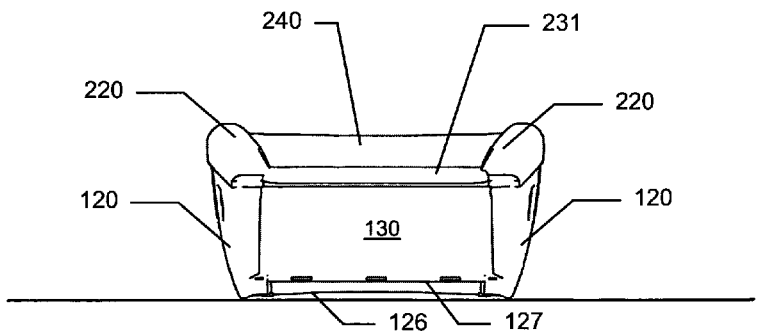
FIG. 7C is a front view of the cradle in FIG. 7A.

In FIGS. 7A-7B cradle 10 is shown with retracted or recessed locking devices 300, and the cradle will be more reclined than if the locking devices 300 were deployed. This puts the seat into an approximate lying position for the child in the cradle. As can be seen from FIG. 7A, side members 120 may have a lower edge 125 against the base that is convex toward the base, for example in the form of rockers, at the same time as the front 130 and rear 140 wall members have a less vertical extension downward, allowing the cradle to be tipped or rocked back and forth, perhaps to entertain the child or to help it fall asleep. As can be seen from FIGS. 7B and 7C, the lower edge 126 of rear wall member 140 and the lower edge 127 of front wall member 130, respectively, are curved concavely toward the floor or plane, and are positioned slightly higher than the lowest point of the side members, such that the front and rear wall members do not come in contact with the base in the starting position as shown in the figures, and at the same time will allow minor irregularities in the base between the side members without the cradle's becoming unstable or tipping due to such irregularities. Preferably each of the undersides of the convex side members or rockers comprises a friction coating, for example a partially inlaid rubber strip (not shown), to prevent the cradle from sliding on the base on which it is set, such as a floor, and to ensure that the rocking does not cause the cradle to move from its starting point on the floor or base.

Alternatively the front 130 and rear 140 wall members may be convex toward the base, and have a greater vertical extension downward than the side members, enabling the cradle to be rocked sideways, not shown.

In an alternative embodiment there is also foreseen the possibility of equipping the underside of the side members with a double curved underside that is convex toward the base to enable the cradle to be rocked in several directions or spun gently around on a flat base.

Figure 8A:
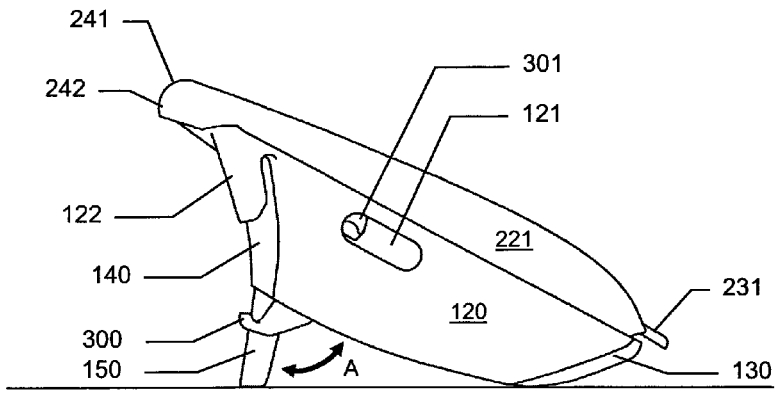
FIG. 8A is a side view of the cradle in FIG. 6A with the support flap deployed.
Figure 8B:
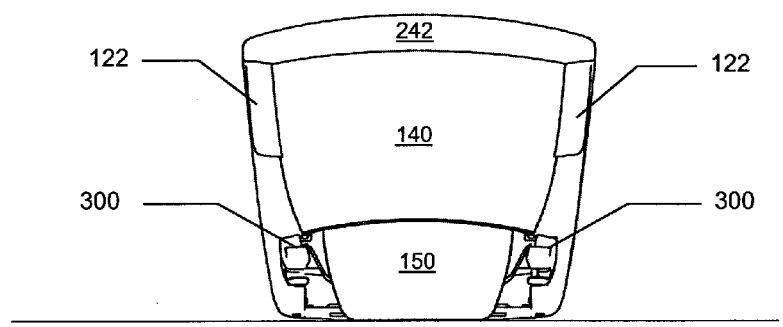
FIG. 8B is a rear view of the cradle in FIG. 8A.
Figure 8C:
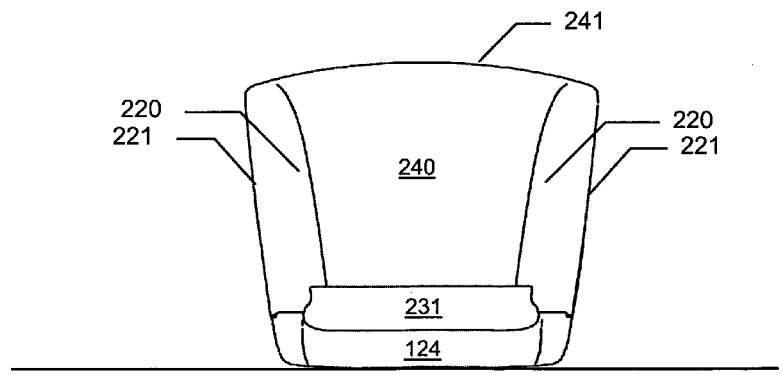
FIG. 8C is a front view of the cradle in FIG. 8A.

In FIGS. 8A-8C the cradle is shown with an open or deployed support flap 150 that has a greater vertical extension than locking devices 300 have. As illustrated by arrow A in FIG. 8A, support flap 150 may be rotated out to the deployed position shown and rotated into the shell to a retracted, recessed position, as in FIGS. 6 and 7. By means of the deployed support flap 150, the cradle assumes a steeper angle when placed on a flat base, such as a floor. This position gives the child a more upright posture such as children often prefer to sit in so that they are able to follow what is happening around them. As can be seen from FIGS. 8A and B, locking devices 300 may be deployed in this position, but they may also be retracted without this having an effect on the angle of the cradle.

FIGS. 9A and 9B show in more detail how cradle 10 is mounted on a chair 1, in this case a child seat of the Tripp-Trapp® type. The invention is not limited to this type of chair, however, and could be attached, and particularly adapted for attachment, to any chair having a chair back that has at least one upper edge, in this embodiment in the form of one or more cross rails 3, 4 extending between the two side members 2 or side pieces that form a conventional chair back, said chair back having at least one lower and one upper substantially horizontal edge.

In this embodiment the backrest in child seat 1 has two horizontal cross rails in the form of an upper 3 and lower 4 rail extending between side members 2. For mounting of cradle 10, locking devices 300 are rotated to a recessed or nearly recessed position, as by pressing push-buttons 131 upward, optionally against a tension spring. The cradle's hooking means 122 are then drawn down over top rail 3 so that the cradle is suspended on the chair.

To ensure that the cradle cannot be loosened from the chair back by, for example, accidental upwardly directed forces, the locking devices 300 on the right and left sides are rotated out of the shell, under and up past the lower edge of mid rail 4, as shown in the figures, optionally by releasing the buttons 131 as a tension spring rotates locking devices 300 into place for the locking position.

Figure 18:
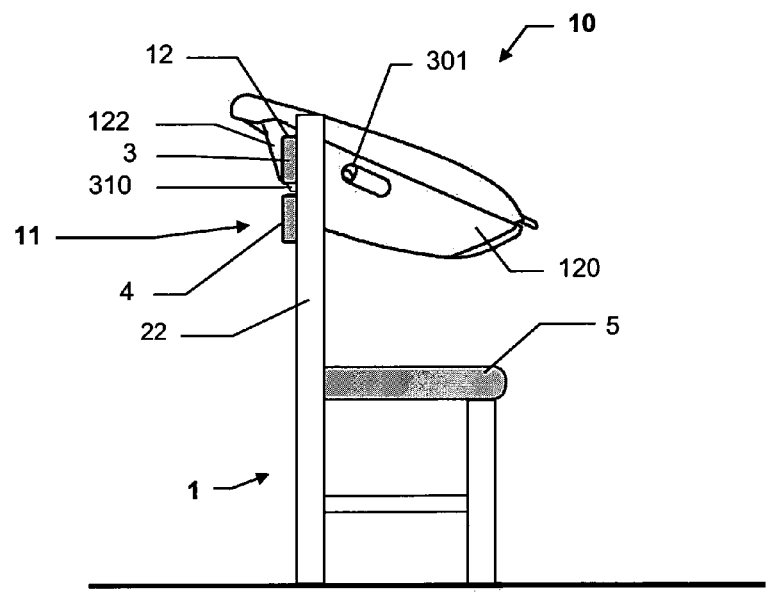
FIG. 18 is a side view of a cradle according to the invention mounted on an ordinary chair.

As can be seen from FIG. 9B, cradle 10 is not supported on seat plate 5 of the chair. In the chair in question, seat plate 5 may optionally be pushed back so as not to come into contact with the cradle and influence the locking, but it should also be noted that in this chair seat plate 5 is shown in its uppermost position with little forward extension, which as a point of departure is adapted for a small child having short thighs on the seat plate, who is to sit and reach up to a dining table. Seat plate 5 may be adjusted for height by sliding it into the aforementioned grooves 7 on the inside of side members 2, which constitute tracks for the level of both the seat plate and a foot plate 6. In an ordinary dining chair, the seat plate would normally be at a greater distance from the upper edge of top rail 3, so that the cradle would not come into conflict with this, as is shown in FIG. 18.

FIG. 10 shows a locking device 300 according to the invention in more detail. As can be seen from the figure, the locking device comprises a stem 309 having a pivot point 302 in the upper end thereof which in this case may be a hole. In this embodiment the locking device is designed to be fixed to a bolt or axle, but locking device 300 may optionally also comprise the actual bolt or axle as a part of the construction. As previously mentioned, the locking device in this embodiment also comprises a button 301, which protrudes into the handle 121 in side member 120, such that the button may be operated in a simple manner at the same time as it is protected against involuntary actuation by being situated in the recess in handle 121. The placement of button 301 is, in this embodiment, at the corner edge in front of pivot point 302 in the upper forward portion of stem 309.

Locking device 300 in this embodiment comprises a stem 309 having a hook in the lower end thereof consisting of an upward oriented catch pin 303 having an upper edge 304 and a depression 305. Depression 305 is preferably fitted to the lower edge of the relevant backrest on the chair, in this case the lower edge of mid rail 4. In the deployed position for locking device 300, the upper edge 304 may advantageously be sloped slightly downward and backward. The purpose of this is that the hook will automatically be rotated slightly forward when cradle 10 is hooked onto the upper edge of the chair back and the lower rear part of the cradle is pivoted toward the chair back, as edge 304 comes into contact with and is pressed forward by the backrest, such that the locking device makes room for the lower edge of the backrest in order then to snap around the under edge and lock the cradle. The locking device may optionally also comprise a guide slot 306 which, in this embodiment, consists of a transverse horizontal groove in the rear edge of stem 309 when in deployed position, which grips onto the lower part of rear wall member 140, which is bent inward in a substantially horizontal edge termination. The bottom end of locking device 300 in deployed state can vary and is preferably approximately flat in order to provide good contact with the base. Optionally it may have a beveled edge 307 which increases in vertical depth toward the back and ensures that the locking device in deployed position is pressed back by the weight of the cradle when it stands on the floor, in order to ensure that the locking device is not accidentally rotated inward into the cradle. Further, stem 309 may in addition have an anterior approximately vertical edge 308 in deployed position which, in this embodiment, is a stop surface which rests against handle 121 on the inside of side member 120 when the locking device is retracted.

Figure 11:
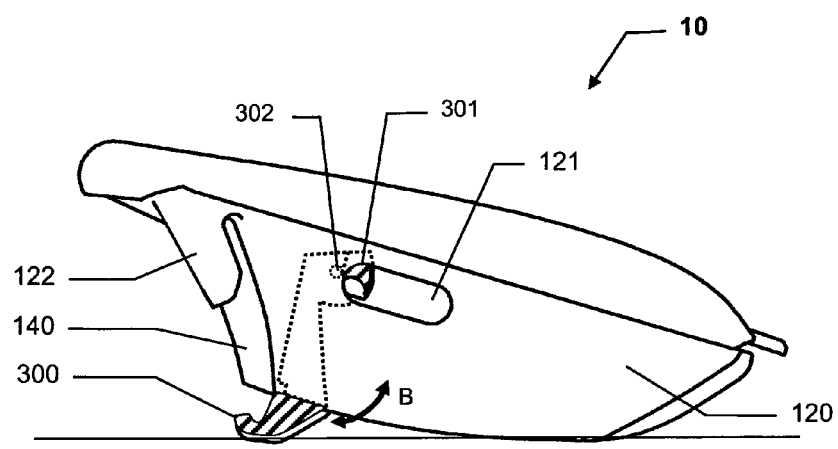
FIG. 11 shows the cradle in FIG. 6A and the locking device in FIG. 10 in deployed state.
Figure 12:
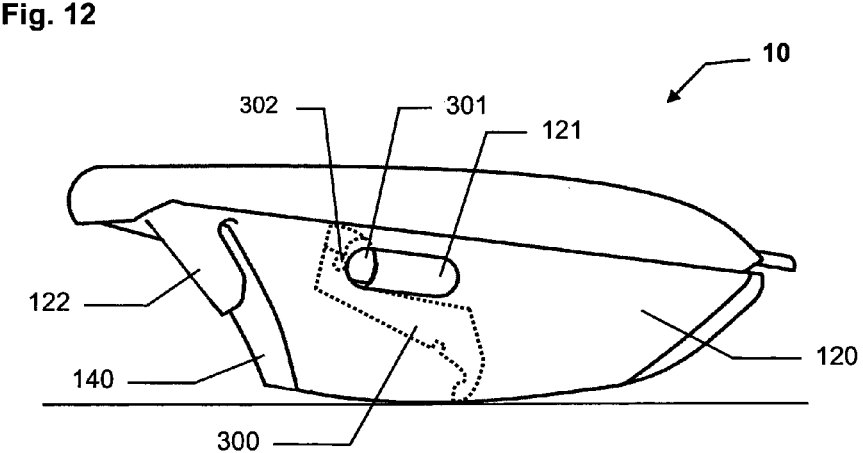
FIG. 12 shows the cradle in FIG. 11 with the locking device retracted.

In FIG. 11 the cradle is shown positioned on a base with locking devices 300 in deployed position. The locking device is drawn with dotted lines to indicate the placement and positioning within shell 100. As can be seen, button 301 protrudes into handle 121, and the actuation of button 301 by pressing it upward will rotate the locking device forward as indicated by arrow B, and into the cradle as shown in FIG. 12. As can be seen, further rotation of locking device 300 is prevented by handle 121, which is a recess in side member 120 where the anterior edge 308 of stem 309 will be stopped against the lower surface of the recess of the handle. It is also important to note that if locking device 300 is spring-loaded for rotation in the opposite direction, namely backwards, the locking device as shown in FIG. 12 will be rotated so far forward that it will be held in a hidden, recessed position by the base toward which it is tensioned. However, if the cradle is lifted up from the floor, or if it is lifted at the rear edge, the locking device will automatically rotate back and out into a deployed position, unless it includes a locking device to lock it in the retracted position, a feature which is also a foreseen alternative. An automatic deployment of the locking device may, however, be an advantageous safety function that causes the hooks 303 to snap out automatically, ready to receive the edge of the backrest and thereby to lock the cradle without the person who is hooking the cradle to the chair back having to perform any special mounting functions.

FIG. 13 shows an alternative embodiment of cradle 10, where the rear hooking means 122 consists of a single hook, here a broad hook covering roughly the entire upper edge of top rail 3 on the seat back of the chair. As can be seen from the figure, the cross rail in the backrest in this embodiment consists of one single element, and the cradle according to the invention can also be used on this type of backrest and all other configurations having an upper and a lower edge onto which the hooking means and locking device(s), respectively, can grip in order to fasten the cradle in a safe and secure manner.

In FIG. 14A another alternative is shown, where the cradle comprises one single central locking device 300, in this example as a broad locking catch that grips onto the middle portion of the lower edge of top rail 3 of the backrest.

In FIGS. 14B and 14C the cradle in FIG. 14A is shown with an alternative embodiment of support flap 150, which in this example comprises two support flaps, fitted on each side of the one centered locking device 300. As shown by the dotted line in FIG. 14B, it is also foreseen that support flap(s) 150, instead of being stowed in the cradle for rotation, may conceivably also be extractable by sliding displacement and can be pushed in and out of the cradle, such as into rear wall member 140 when they are not in use. Preferably such a push/slide solution comprises a locking device or safety stops to prevent the support flap(s) from unintentionally being pushed in during use.

The embodiments shown in FIGS. 13 and 14A-C may of course be combined. The width of hooking means 122 and locking device(s) 300 may be varied in order to adapt to the chair back or other considerations and/or to keep the elements from influencing each other. Embodiments having more than two hooks 122 and/or locking devices 300 and/or support flaps 150 are also foreseen, for example in order to adapt the cradle to special chairs. Optionally the mentioned elements may be wholly or partly removable and interchangeable so that the cradle is adaptable to various types of chairs by using adjusted elements for each type of chair. Such parts may, for example, be supplied as a separate kit for separate chair types.

Figure 15:
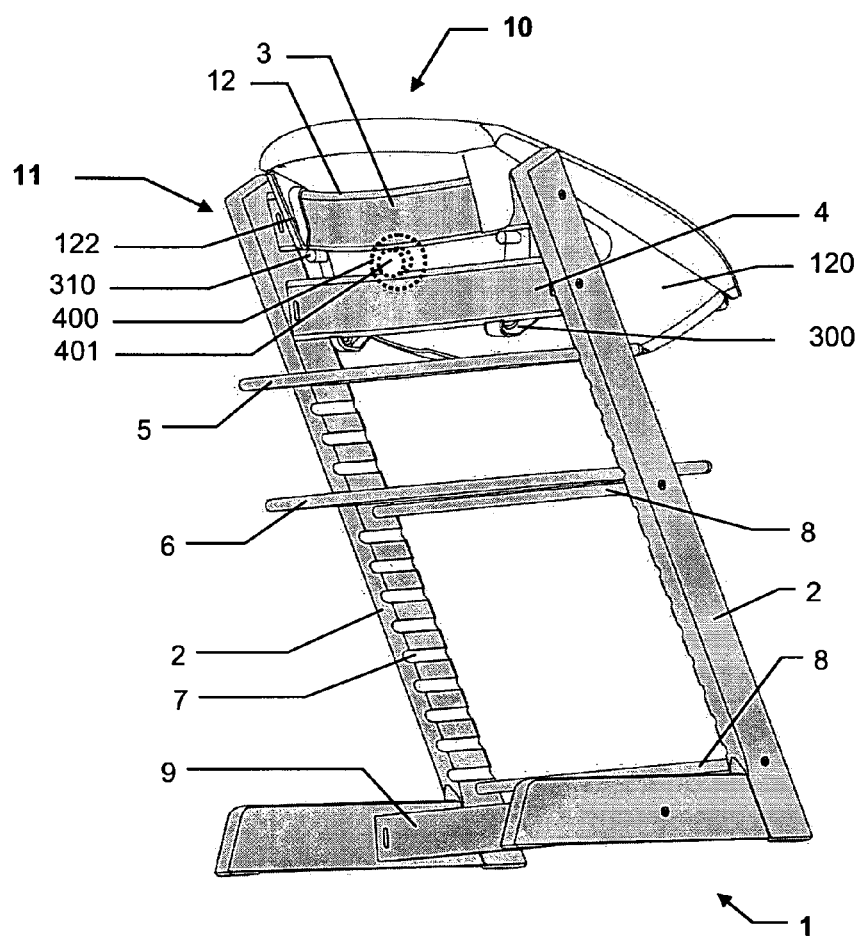
FIG. 15 is a rear perspective view of an embodiment of the cradle according to the invention mounted on a child seat of the TrippTrapp® type.

FIG. 15 shows another embodiment of cradle 10 where, in addition to hooking means 122 and the hook-shaped locking devices 300, the cradle is also provided with two additional locking devices 310 which project backward and substantially horizontally out from the rear part of side members 120 and/or the outer part of rear wall member 140, in this case at the lower edge of the chair's top rail 3 in chair back 11. The locking devieces 310 may rotrude out of the rear part of the cradle as mentioned, beyond he outer surfaces thereof in an active locking position, and may be retracted flush with said aouter surfaces and into the cradle when in an inactive, non-locking position.

The bar shaped locking devices 310 give the cradle extra stability and safety by preventing the cradle from being lifted off the chair back. Locking devices 310 can function alone in lieu of the hook shaped locking devices 300 or in combination with these as described above. Locking devices 310 are operable by means of their own buttons (not shown) or by the aforementioned buttons 301, for example, at the same time as they actuate the hook shaped locking devices 300, if these are also present. Locking devices 310 may optionally be spring-loaded so that they may be pushed into side members 120 and/or rear wall member 140 when the cradle is hung down over a chair back, and will snap out when the cradle comes into the correct position on the chair back, especially a vertically correct position in relation to the chair back.

In an alternative embodiment it is also foreseen that the rear part of side members 120 and/or the outer part of rear wall member 140 may include other locking devices that lock the cradle to a seat back. For example, it is foreseen that there can be used a screw mechanism which is tightened from the rear side of the chair back, and bears against a lower edge of an element in the chair back, such as a lower edge of a cross rail 3, 4, especially through the opening between cross rails 3, 4 in the backrest. An example of such a screw mechanism is shown with dotted lines in FIG. 15, where it comprises a screw and a handle element 401 which comprise a screw piece that is screwed into the cradle and a disk/stopper element 400 which is unable to pass through the opening in the back support, permitting the locking device to be tightened from the rear side of the chair's backrest and locking the cradle securely to the chair back.

FIGS. 16A-16C show an alternative embodiment of the invention. In FIG. 16A cradle 10 is mounted on a top rail 3 of a chair back in a child seat 1, and the cradle has a slightly different form than is illustrated in the preceding drawings. As can be seen from the figures, the cradle has a distinctive upper and outer edge 221 along the entire side member 120 of the cradle, where the lower edge may also be used as a handle 121 to carry and move the cradle. The cradle moreover has one single large hooking means 122 on the rear portion thereof which is adapted to be hooked over the transverse top rail 3 of a chair. In this embodiment cradle 10 has only two bar shaped locking devices 310 projecting backward substantially horizontally from the rear part of side members 120 and/or the outer part of rear wall member 140. Locking devices 310 are operable by buttons 301 in side members 120, and in this embodiment the locking devices are spring-loaded as shown by the dotted lines in FIG. 16C. Spring-loading can be obtained, for example, by a spring box 360 and a helical spring 361 which, for example, are tensioned between a wall of the spring box and the locking device 310 such that the locking device is tensioned toward a deployed, active position as shown in FIG. 16C. As can be seen from FIG. 16C, locking devices 310 in this embodiment have a curved lower outer edge, or a slightly beveled edge, where the element has a somewhat greater horizontal extension in the rear upper edge than in the rear lower edge. This beveling or curved portion of the rear edge of the locking device is adapted so that the element rests against the front side of the forward upper edge of the top rail 3 of the chair back, so that the element will be pushed into the cradle against the tension spring as the cradle is lowered onto the chair, thereafter to snap out under the edge of the cross rail when the cradle has been lowered to its correct position. An indicator panel 311 shows whether the cradle has been correctly installed, with a red marker indicating when the locking devices are entirely or partially pushed into the cradle, and a green mark indicating when the locking device is in fully deployed position. The marker may be a color on the locking device itself, which emerges in a hole or opening in side member 120 of the cradle. The two locking devices 310 are preferably independent of one another, and each is operated by its own push button 301 on its respective side member 120.

Cradle 10 in FIGS. 16A-16B also has a support flap 150 similar to the previous embodiments. As can be seen from FIG. 16B, the flap in this embodiment comprises one single central and broad flap having lower supporting legs corresponding approximately to the width of the cradle's footprint against the base. Support flap 150 in this embodiment is pivotable inward toward the underside of the cradle, as indicated by arrow A in FIG. 16C, where a cavity fitted thereto in an underside panel of cradle 10 receives and locks the support flap, such as by friction points/reliefs in the cavity. Cradle 10 can thus be placed on a base in two positions: a free-lying horizontal position and an upraised inclined position. In the horizontal position, support flap 150 will lie within the extension of side members 120 such that the cradle can be rocked in the longitudinal direction provided that the side members have a curved form similar to that shown in FIG. 16.

Figure 17A:
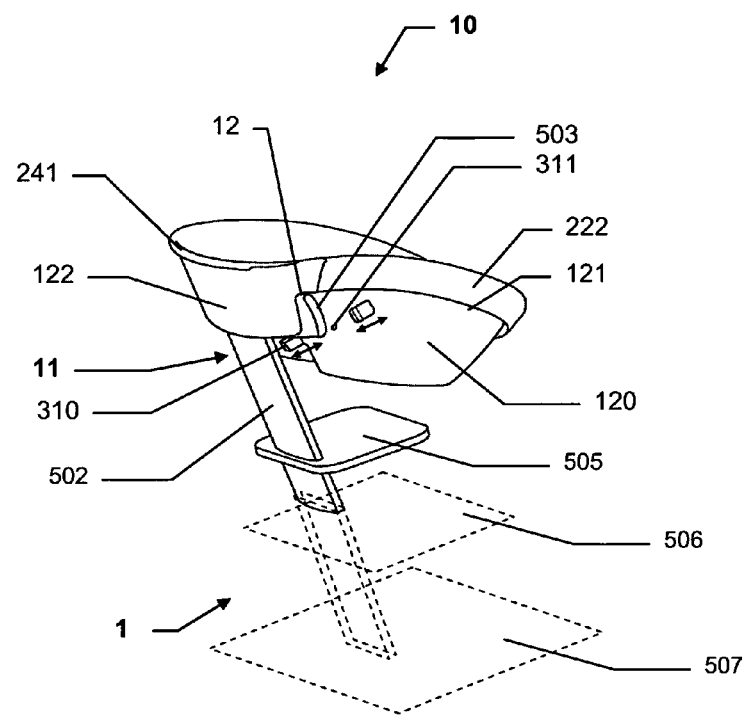
FIG. 17A is a rear perspective view of a cradle according to the invention mounted on a chair.
Figure 17B:
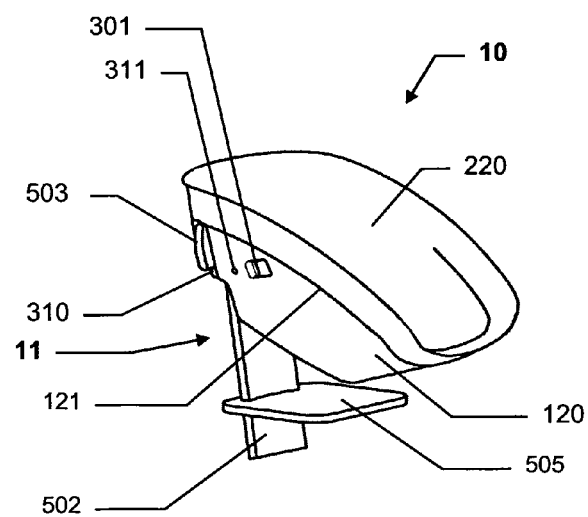
FIG. 17B is a front perspective view of the cradle in FIG. 17A.

FIGS. 17A and 17B show the cradle from FIG. 16 mounted on a chair back having a central stem, and in particular the cradle hangs on a top crosspiece 503 on the upper portion of the chair back. Instead of side members, such chairs are based on a central stem 502 which is anchored in a frame or a foot 507 (dotted lines) such as, for example, a plate or cross-base. The seat portion of the chair consists of a seat plate 505 affixed to stem 502, where the stem also functions as part of the seat back and simultaneously supports an upper horizontal backrest 503 to which cradle 10 is attached. In FIG. 17A it can be seen how locking device 310 sticks out on the underside of the lower edge of crosspiece 503. The chair may optionally also comprise a foot support plate 506 which may be used by a child sitting on the seat plate 505 when the cradle is not mounted on the chair.

The horizontal placement of locking device 310 in such an embodiment may advantageously be as close as possible to stem 502 in order, in addition, to limit or lock the horizontal displacement of the cradle on the chair back, such as on crosspiece 503.

FIG. 18 shows the cradle according to the invention mounted on an ordinary chair, where the side members and the backrest include back legs 22. All reference numerals correspond to parts as indicated on the other figures. The cradle's hooking means 122 are brought down over the upper edges of the chair back, for example the upper edge of top rail 3, and locking devices 310 rest against the lower edge of the same cross rail. Alternatively, locking devices such as the hooks described earlier could also be used, and could preferably be turned to hold onto the bottom edge of mid rail 4.

FIG. 19 shows a cradle according to the invention mounted on a child seat where the hooking means are ferrules 323 situated in the outer upper rear corners of the cradle and adapted to be hooked over the upper edges of side members 2 of the chair back, the upper part of the chair's sides, side members or back legs. As can be seen from the figures, the hooking means have an opening for top rail 3 having a certain depth, thereby determining the level of the cradle in relation to the chair. In this embodiment the cradle may also comprise one or more locking devices 310, here illustrated by a bar shaped, centered locking device which is preferably spring-loaded. It is not necessary to use buttons to release the locking devices, since they may also be designed to be easily pushed in from the back side of the chair against the spring load in order to lift the cradle from the chair. Preferably two such locking devices are positioned near the chair's side members to enable the cradle to be lifted as the locking devices are pressed inward. All reference numerals correspond to parts as indicated for the other figures.

Figure 20A:
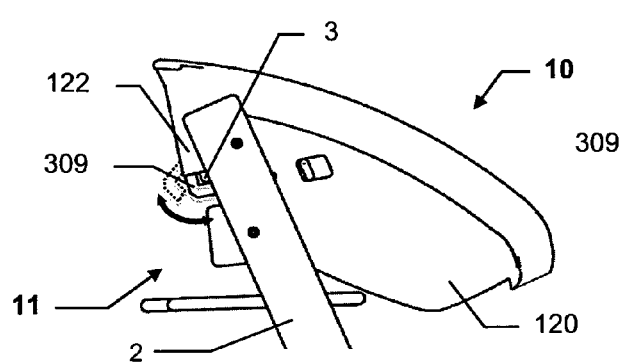
FIG. 20A is a side view of a cradle according to the invention mounted on a chair.
Figure 20B:
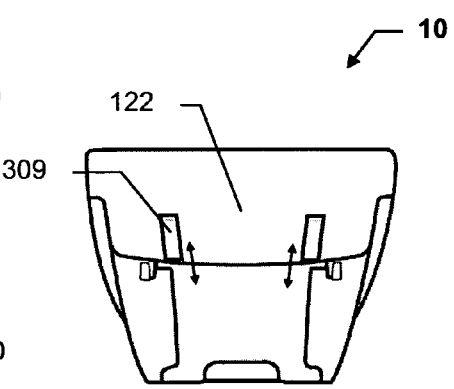
FIG. 20B is a rear view of the cradle in FIG. 20A.

In a further alternative embodiment locking devices 300 or locking devices 310 may be supported by bearings in hooking means 122 as shown in FIGS. 20A and 20B, particularly if the hooking means are expansive. The hooking means 122 may thus comprise, for example, one or more hook shaped locking devices 309 rotatable to a position in under a lower edge of a cross rail 3 in chair back 11, from the back side of the chair back, or the locking device(s) 309 may be pushed in under a lower edge of one or more of the chair's elements from the back side. Optionally a combination of pushing and rotating of the locking device(s) 309 is used, such as from a stowed position in FIG. 20B, where the locking device(s) is/are integrated in the hooking means 122, thereafter to be pushed downward as shown by the arrows and then rotated backwards during mounting as shown by the dotted line in FIG. 20A, and then rotated in under cross rail 3 in chair back 11. The upper edge of the hook shaped end of locking device(s) 309 may have a friction coating and/or be precisely fitted to the cross rail so that it has to be clamped in place under cross rail 3 and is thus not easily releasable. Optionally the locking device(s) 309 may comprise buttons or levers to release the locking action, as in the variants discussed earlier.

The shell construction of the cradle makes it light in weight and easy to move around. The shell construction also makes it possible to recess/stow the locking devices and supporting devices in the seat so that they are not in the way when they are not in use.

The cradle 10 according to the invention is simple and easy to mount on an ordinary chair or a child seat by hooking it onto a horizontal part of the backrest and locking it securely to the chair back by extending the locking devices so that they bear against a lower edge of a part of the backrest. By actuation of the buttons on the side members, the locking devices can be retracted, or partially retracted, into the cradle so that the cradle may easily be lifted off the chair on which it is mounted and used in a free-standing position on the floor or in an inclined position on the floor with the aid of support flap 150, at the same time as the chair may be used for its usual purpose. Thus, there is no need for extra parts, such as a stand, in order to alternate between placing the cradle in a high position, such as at a dining table, or setting it on the floor or another base. Nor is there a need for assembly fittings or other odd parts or screws that must be kept and stored when the cradle is not attached to the chair, and mounting and demounting can be accomplished without the use of tools.

The invention claimed is:

1. A cradle for a chair, wherein the chair comprises a chair back having at least one element having an upper end or edge, said cradle comprising at least one first hook on an upper rear part of the cradle that enables the cradle to be hooked over the upper end or edge of the at least one element of the chair back, wherein:
   the cradle is adapted to stand alone on a base when not hooked onto the chair back and, in both cases, used as a cradle or a seat for a baby or small child,
   the cradle further comprises at least one movable second hook in a lower rear part of the cradle, which is movable from an inactive position in which the at least one movable second hook is retracted such that the movable second hook does not restrict the movement of the cradle relative to the chair, to an active position in which the at least one movable second hook protrudes from the lower rear part of the cradle so as to bear against at least one lower edge of either the at least one element of the chair back or another element of the chair back and lock the cradle to the chair, and
   the at least one movable second hook is housed in the cradle when in the inactive position, and the at least one movable second hook is operable by at least one button or by at least one lever, which is accessible from the outside of the cradle.

2. The cradle for a chair according to claim 1, wherein the at least one element of the chair back is selected from the group consisting of: one or more cross rails, side members, chair members, back legs or a central stem, and the cradle is hooked by the at least one first hook over the upper end or edge of the at least one element of the chair back.

3. The cradle for a chair according to claim 2, wherein the at least one first hook is ferrule adapted to fit down over the upper end, part or edge of the at least one element of the chair back, said at least one element of the chair back is chosen from one or more of: the side members, the upper part of the chair sides, walls or the back legs.

4. The cradle for a chair according to claim 2, wherein the at least one first hook is adapted to be hooked over the at least one element of the chair back which is substantially horizontal.

5. The cradle for a chair according to claim 1, wherein the at least one element of the chair back comprises a lower edge and where the at least one movable second hook is configured to bear against a substantially horizontal lower edge of the at least one element of the chair back.

6. The cradle for a chair according to claim 5, wherein the at least one movable second hook is configured to bear against a substantially lower edge of a cross rail.

7. The cradle according to claim 6, wherein the at least one movable second hook comprises at least one substantially horizontal element slidably attached to the cradle and movable from the inactive position to bear against the substantially horizontal lower edge of the cross rail in the active position when the cradle is hooked onto the chair back, where the element is bar shaped.

8. The cradle according to claim 7, wherein the at least one substantially horizontal element is movable in a direction parallel to the cradle.

9. The cradle according to claim 5, wherein the at least one movable second hook comprises at least one hook pivotably mounted on the cradle and capable of rotation from the inactive position to grip around the substantially horizontal lower edge of the at least one element of the chair back in the active position when the cradle is hooked onto the chair back.

10. The cradle according to claim 1, wherein the at least one movable second hook comprises a combination of a slidable and a pivotable second hook.

11. The cradle according to claim 1, wherein the at least one movable second hook is spring-loaded in order to bring the at least one movable second hook from the inactive position to the active position for locking the cradle to the chair.

12. The cradle according to claim 1, wherein the cradle comprises an indicator panel for the at least one movable second hook, which shows whether the cradle is correctly mounted on the chair.

13. The cradle according to claim 12, wherein the indicator panel shows whether the cradle is correctly mounted on the chair by a visible panel displaying a red marker when the at least one movable second hook is in the inactive position and displaying a green marker when the at least one movable second hook is in the active position.

14. The cradle according to claim 1, wherein the at least one movable second hook is positioned in the cradle side members, rear wall member or first hook or a combination of these parts.

15. The cradle according to claim 1, wherein the bottom of the cradle is concave in the longitudinal direction toward a base, enabling the cradle to be rocked when standing on the base, with the side members having a lower concave edge enabling to be used as rockers.

16. The cradle according to claim 15, wherein the underside of the side members includes a friction coating.

17. The cradle according to claim 1, wherein the at least one movable second hook in the active position functions as at least one leg against a base when the cradle is not mounted on a chair, and positions the cradle at a steeper angle toward the base than when the at least one second hook is inactive.

18. The cradle according to claim 1, wherein the cradle comprises one or more support flaps which are rotatable or slidable in and out of the cradle, in order to provide support against a base when the cradle is not mounted on a chair, and which position the cradle at a steeper angle toward the base than when the cradle stands unsupported on the base, where the support flaps provide support under the rear part of the cradle during use, and wherein said support flaps are housed in the cradle when not in use, in the rear wall member or the underside of the cradle.

19. The cradle according to claim 1, wherein the cradle has a shell construction in a form of a hard shell comprising two parallel side members connected together by a front wall member and a rear wall member, or has an underside in a form of a plate.

20. The cradle according to claim 19, wherein the cradle has a seat portion comprising a backrest having an upper backrest edge, two inner side members having upper side edges, and a leg support.

21. The cradle according to claim 20, wherein the seat portion constitutes a partially self-supporting seat cover, which comprises a textile.

22. The cradle according to claim 20, wherein the seat portion is suspended around the upper edges of the shell by attachment to the shell outer, upper parts by fastening means or by means of elastic material around substantially the entire circumference of the seat portion.

23. The cradle according to claim 1, wherein the cradle comprises one downward oriented first hook in the upper rear part thereof and two fastening devices in a form of slidable spring-loaded elements.

24. The cradle according to claim 23, wherein the slidable spring-loaded elements are bar shaped.

25. The cradle according to claim 1, wherein the cradle is adapted for mounting on a conventional chair, or a child seat.

26. A system comprising a cradle and a chair, wherein the chair comprises a chair back having at least one element having an upper end or edge, said cradle comprising at least one first hook on a rear part of the cradle that enables the cradle to be hooked over the upper end or edge of the at least one element of the chair back, wherein:
- the cradle is adapted to stand alone on a base when not hooked onto the chair back and, in both cases, used as a cradle or a seat for a baby or small child,
- the cradle further comprises at least one movable second hook in the rear part of the cradle configured to be brought from an inactive position in which the at least one movable second hook does not restrict the movement of the cradle relative to the chair, to an active position in which the at least one movable second hook configured to bear against at least one lower edge of the at least one element of the chair back and to lock the cradle to the chair, and
- the at least one movable second hook is housed in the cradle when in the inactive position, and the at least one movable second hook is operable by at least one button or by at least one lever, which is accessible from the outside of the cradle.

27. The system according to claim 26, wherein the at least one element of the chair back is a substantially horizontal cross rail, and wherein the at least one movable second hook is configured to bear against a substantially lower edge of the cross rail.

* * * * *